US012311367B2

(12) United States Patent
Diamond et al.

(10) Patent No.: US 12,311,367 B2
(45) Date of Patent: May 27, 2025

(54) MICROFLUIDIC DEVICES AND METHODS FOR MONITORING BLOOD BIOLOGY UNDER FLOW

(71) Applicant: THE TRUSTEES OF THE UNIVERSITY OF PENNSYLVANIA, Philadelphia, PA (US)

(72) Inventors: Scott L. Diamond, Bala Cynwyd, PA (US); Jason Rossi, Philadelphia, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 1038 days.

(21) Appl. No.: 16/981,542

(22) PCT Filed: Mar. 19, 2019

(86) PCT No.: PCT/US2019/022965
§ 371 (c)(1),
(2) Date: Sep. 16, 2020

(87) PCT Pub. No.: WO2019/183090
PCT Pub. Date: Sep. 26, 2019

(65) Prior Publication Data

US 2021/0114026 A1 Apr. 22, 2021

Related U.S. Application Data

(60) Provisional application No. 62/645,525, filed on Mar. 20, 2018.

(51) Int. Cl.
*B01L 3/00* (2006.01)

(52) U.S. Cl.
CPC . *B01L 3/502738* (2013.01); *B01L 2300/0816* (2013.01); *B01L 2300/0819* (2013.01);
(Continued)

(58) Field of Classification Search
CPC ..... B01L 2300/0819; B01L 2300/0861; B01L 2300/0816
See application file for complete search history.

(56) References Cited

U.S. PATENT DOCUMENTS 6,235,175 B1 5/2001 Dubrow et al.
6,637,463 B1 * 10/2003 Lei .......................... B01L 13/02 137/841

(Continued)

FOREIGN PATENT DOCUMENTS

JP 2006501449 A 1/2006
JP 5477341 B2 4/2014

(Continued)

OTHER PUBLICATIONS

International Search Report and Written Opinion dated May 14, 2019 for International Patent Application No. PCT/US2019/022965.

(Continued)

*Primary Examiner* — Jill A Warden
(74) *Attorney, Agent, or Firm* — Saul Ewing LLP; Kathryn Doyle; Sean P. Ritchie

(57) ABSTRACT

The present invention provides microfluidic devices and methods for measuring blood. The microfluidic devices of the present invention include an inlet port adapted and configured to receive a fluid sample, a microfluidic flow path in fluidic communication with the inlet port, an outlet in fluidic communication with the microfluidic flow path, the outlet: having a smaller cross-sectional area than the microfluidic flow path; and adapted for communication with a pressure sink. The microfluidic devices further include a priming circuit in fluidic communication with the microfluidic flow path such that when a priming fluid is applied under pressure to the priming circuit, the priming fluid will (Continued)

flow through the microfluidic flow path to the inlet port due to low resistance to laminar flow in the microfluidic flow path relative to the outlet.

7 Claims, 16 Drawing Sheets

(52) U.S. Cl.
CPC .................. *B01L 2300/0829* (2013.01); *B01L 2400/0475* (2013.01); *B01L 2400/0605* (2013.01)

(56) References Cited

U.S. PATENT DOCUMENTS

| | | | | |
|---|---|---|---|---|
| 8,206,593 | B2 | 6/2012 | Lee et al. | |
| 9,790,549 | B2 | 10/2017 | Blainey et al. | |
| 2003/0190608 | A1 | 10/2003 | Blackburn | |
| 2004/0175298 | A1 | 9/2004 | Choikhet | |
| 2006/0160206 | A1 | 7/2006 | Holmquist et al. | |
| 2007/0116594 | A1 | 5/2007 | Shimizu et al. | |
| 2009/0104637 | A1 | 4/2009 | Ismagilov et al. | |
| 2010/0184928 | A1 * | 7/2010 | Kumacheva ............ | B01F 23/41 422/131 |
| 2011/0152108 | A1 | 6/2011 | Brenan et al. | |
| 2015/0024965 | A1 | 1/2015 | Chee et al. | |
| 2016/0016169 | A1 | 1/2016 | Ben-Yakar et al. | |
| 2017/0197214 | A1 | 7/2017 | Toner et al. | |

FOREIGN PATENT DOCUMENTS

| | | | |
|---|---|---|---|
| WO | 2010/017210 | A1 | 2/2010 |
| WO | 2010/040103 | A1 | 4/2010 |
| WO | 2017/180949 | A1 | 10/2017 |

OTHER PUBLICATIONS

Colace , et al., "Thrombus Growth and Embolism on Tissue Factor-Bearing Collagen Surfaces Under Flow: Role of Thrombin With and Without Fibrin", Arterioscler Thromb Vasc Biol. vol. 32, Apr. 2012, 1466-1476.

Li , et al., "Ex vivo recapitulation of trauma-induced coagulopathy and preliminary assessment of trauma patient platelet function under flow using microfluidic technology", J. Trauma Acute Care Surg, vol. 80 No. 3, Oct. 2015, 440-449.

Maloney , et al., "P2Y12 or P2Y1 inhibitors reduce platelet deposition in a microfluidic model of thrombosis while apyrase lacks efficacy under flow conditions", Integr. Biol. 2, Jan. 2010, 183-192.

Neeves , et al., "Microfluidic focal thrombosis model for measuring murine platelet deposition and stability: PAR4 signaling enhances shear-resistance of platelet aggregates", J. of Thrombosis and Haemostasis, vol. 6, Sep. 2008, 2193-2201.

Welsh , et al., "Platelet-targeting sensor reveals thrombin gradients within blood clots forming in microfluidic assays and in mouse", J. of Thrombosis and Haemostasis, vol. 10, Aug. 2012, 2344-2353.

The Extended European Search Report dated Oct. 28, 2021, of counterpart European Application No. 19770705.2.

* cited by examiner

MICROFLUIDIC DEVICES AND METHODS FOR MONITORING BLOOD BIOLOGY UNDER FLOW

CROSS-REFERENCE TO RELATED APPLICATIONS

This application is a 35 U.S.C. § 371 national phase application from, and claims priority to, International Application No. PCT/US2019/022965, filed Mar. 19, 2019 and published under PCT Article 21 (2) in English, which claims the benefit of priority under 35 U.S.C. § 119 (e) to U.S. Provisional Patent Application Ser. No. 62/645,525, filed Mar. 20, 2018, all of which applications are incorporated herein by reference in their entireties.

STATEMENT REGARDING FEDERALLY SPONSORED RESEARCH OR DEVELOPMENT

This invention was made with government support under HL103419 and HL131053 awarded by National Institutes of Health. The government has certain rights in the invention.

BACKGROUND OF THE INVENTION

The monitoring of blood coagulation, anti-platelet therapy, anticoagulation therapy, hemophilia therapy, surgical bleeding, trauma bleeding, and platelet function form the basis of a very large (>$1 billion) diagnostics market. Few devices or systems exist on the market for monitoring blood under flow conditions analogous to those that exist within the human body and those that do have limited utility and only operate in the absence of full coagulation that includes thrombin and fibrin generation.

SUMMARY OF THE INVENTION

Embodiments of the present invention provide a microfluidic device including: an inlet port adapted and configured to receive a fluid sample; a microfluidic flow path in fluidic communication with the inlet port; an outlet in fluidic communication with the microfluidic flow path, the outlet: having a smaller cross-sectional area than the microfluidic flow path; and adapted for communication with a pressure sink; and a priming circuit in fluidic communication with the microfluidic flow path such that when a priming fluid is applied under pressure to the priming circuit, the priming fluid will flow through the microfluidic flow path to the inlet port due to low resistance to laminar flow in the microfluidic flow path relative to the outlet.

In some embodiments, the outlet includes an outlet channel in fluidic communication with the microfluidic flow path; and an outlet port in fluidic communication with the outlet channel. In some embodiments, outlet channel has a cross-sectional area that is less than about 60% of a cross-sectional area of the microfluidic circuit.

In some embodiments, the microfluidic flow path, the outlet, and the priming circuit are coupled at a single location. In some embodiments, the priming circuit includes a check valve adapted and configured to resist flow from the microfluidic flow path into the priming circuit. In some embodiments, the check valve is a single check valve in fluidic communication with a plurality of microfluidic flow paths. In some embodiments, the microfluidics device of the present invention additionally includes one or more reagents dried within at least one of the inlet and the microfluidic flow path.

Another aspect of the invention provides a microfluidic device including a plurality of microfluidic circuits, each microfluidic circuits including: an inlet port adapted and configured to receive a fluid sample; a microfluidic flow path in fluidic communication with the inlet port; and an outlet in fluidic communication with the microfluidic flow path, the outlet: having a smaller cross-sectional area than the microfluidic flow path; and adapted for communication with a pressure sink; a priming circuit in fluidic communication with each of the microfluidic flow paths such that when a priming fluid is applied under pressure to the priming circuit, the priming fluid will flow through the microfluidic flow paths to the inlet ports due to low resistance to laminar flow in the microfluidic flow path relative to the outlet.

In some embodiments, the microfluidic flow paths converge to a spatially compact sensing region.

In some embodiments, the microfluidic flow paths each have a substantially identical pressure drop between the inlet port and the spatially compact sensing region. In some embodiments, the microfluidic flow paths each have a substantially identical distance between the inlet port and the spatially compact sensing region.

In some embodiments, the plurality of inlet ports are arranged in a single line. In some embodiments, the plurality of inlet ports are spaced along the single line at an inter-port distance compatible with a multi-channel pipette.

In some embodiments, each of the microfluidic circuits further includes: one or more reagents dried within at least one of the inlet and the microfluidic flow path. In some embodiments, the one or more reagents differs amongst the plurality of microfluidic circuits.

Another aspect of the invention provides a method for measuring blood. The method includes: injecting a priming fluid through the priming circuit of the microfluidic devices as described herein; loading blood into one or more of the inlet ports; applying a pressure source to the one or more inlet ports to force the blood into the microfluidic flow paths; and imaging flow along the microfluidic paths.

In some embodiments, the blood is pre-mixed with one or more reagents.

Another aspect of the invention provides a microfluidic device including: a plurality of microfluidic circuits, each microfluidic circuit including: an inlet port adapted and configured to receive a fluid sample; and a microfluidic flow path in fluidic communication with the inlet port, wherein the microfluidic flow paths iteratively converge pairwise to form a converged single microfluidic flow path; an outlet channel in fluidic communication with the converged single microfluidic flow path; an outlet port in fluidic communication with the outlet channel, the outlet port adapted and configured to collect a fluid sample; and a priming circuit in fluidic communication with the converged microfluidic flow path and the outlet channel at a single location, such that when a priming fluid is applied under pressure to the priming circuit, the priming fluid flows simultaneously through the microfluidic flow paths to the inlet ports and through the outlet channel to the outlet port. In some embodiments, the converged single microfluidic flow path and the outlet channel have cross-sectional dimensions within 10% of each other.

Another aspect of the invention provides: a microfluidic device including: a substrate having a surface; an adhesive coating deposited onto the surface of the substrate; a biochemical coating deposited in a pattern directly onto a portion of the adhesive coating; and a chip comprising: a plurality of microfluidic channels having an open boundary, each microfluidic channel comprising: an inlet port adapted and configured to receive a fluid sample; a microfluidic flow path in fluidic communication with the inlet port; an outlet channel having an open surface, the outlet channel in fluidic communication with the plurality of microfluidic channel; an outlet port in fluidic communication with the outlet channel, the outlet port adapted and configured to collect a fluid sample; a priming circuit having an open surface, the priming circuit in fluidic communication with the microfluidic channels and the outlet channel, such that when a priming fluid is applied under pressure to the priming circuit, the priming fluid flows simultaneously through the microfluidic flow paths to the inlet ports and through the outlet channel to the outlet port; wherein the chip is mounted onto the adhesive coating such that at least a portion of the microfluidic flow paths overlaps with the biochemical coating, and wherein the adhesive coating bonds the chip to the substrate, thereby fluidly sealing the open surface of the microfluidics channels, the outlet channel, and the priming circuit.

In some embodiments, the biochemical coating is deposited onto the adhesive coating by printing.

BRIEF DESCRIPTION OF THE DRAWINGS

For a fuller understanding of the nature and desired objects of the present invention, reference is made to the following detailed description taken in conjunction with the accompanying drawing figures wherein like reference characters denote corresponding parts throughout the several views.

DEFINITIONS

The instant invention is most clearly understood with reference to the following definitions:

As used herein, the singular form "a," "an," and "the" include plural references unless the context clearly dictates otherwise.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

As used in the specification and claims, the terms "comprises," "comprising," "containing," "having," and the like can have the meaning ascribed to them in U.S. patent law and can mean "includes," "including," and the like.

Unless specifically stated or obvious from context, the term "or," as used herein, is understood to be inclusive.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 (as well as fractions thereof unless the context clearly dictates otherwise).

Unless specifically stated or obvious from context, as used herein, two (or more) values can be understood to be "substantially identical" if the values are within 10%, 9%, 8%, 7%, 6%, 5%, 4%, 3%, 2%, 1%, 0.5%, 0.1%, 0.05%, or 0.01% of the other value(s).

DETAILED DESCRIPTION OF THE INVENTION

Aspects of the invention provide devices and methods for monitoring fluids (e.g., biological fluids such as blood) under flow conditions. Embodiments of the invention include novel microfluidics devices capable of generating biologically and hemodynamically relevant flow conditions. The devices and methods of the invention are suitable for monitoring platelet function, coagulation function, fibrinolysis, fibrinolytic resistance, and drug function in assays of bleeding risk, thrombosis risk or fibrinolysis risk. The devices and methods can also be used to monitor inflammation, immune systems activation, fibrinolytic resistance, and fibrinolysis. The invention can be applied in the fields of oncology, transplant therapy, trauma, cardiovascular disease management, hematological disease management, elective surgery, trauma surgery, and hemophilia management, and can aid in the treatment of diseases of the blood, blood cells, and blood plasma.

Microfluidics Devices

Figure 1:
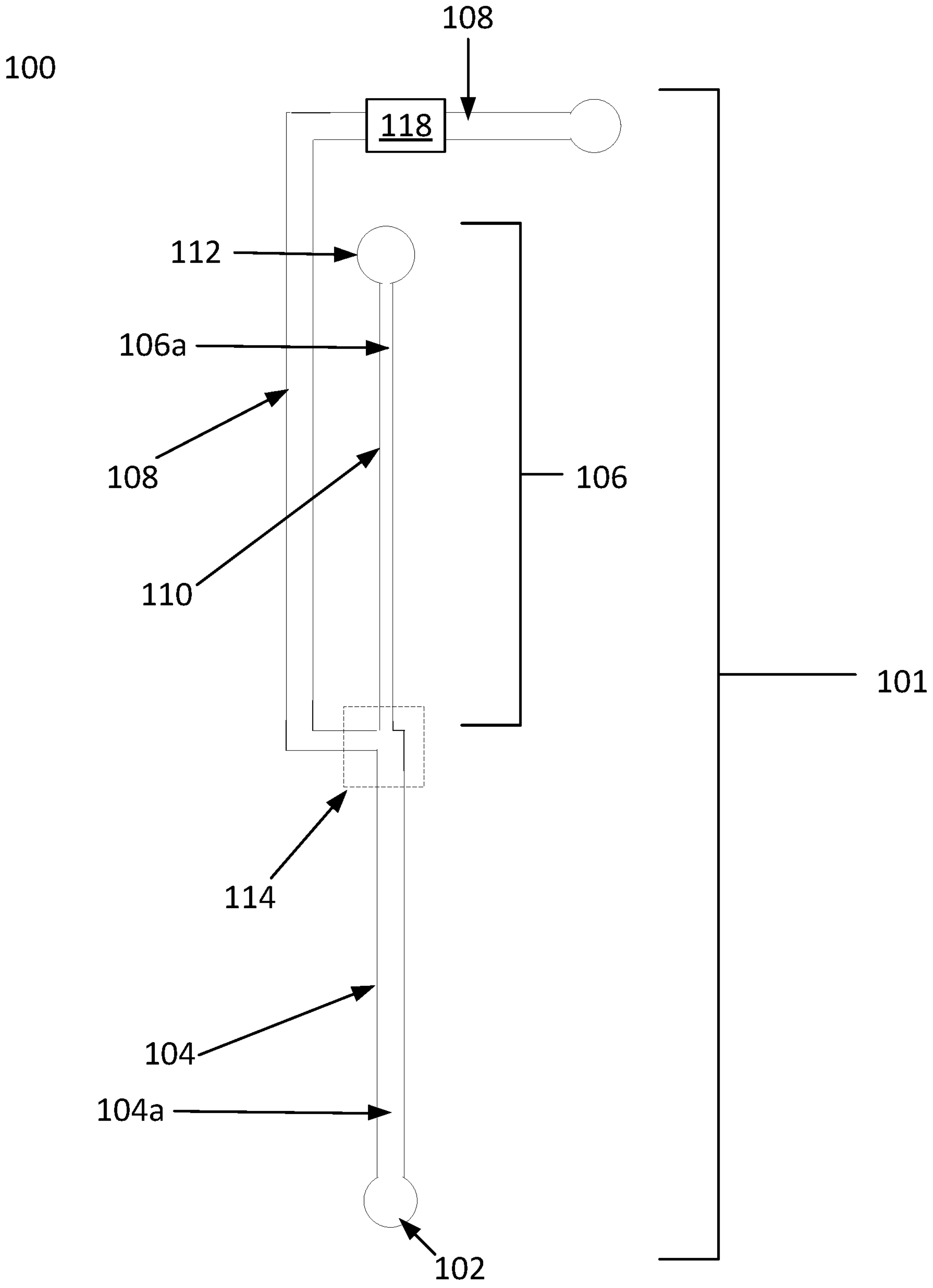
FIGS. 1-5 depict a microfluidic device for monitoring blood biology under flow conditions according to an embodiment of the invention.

Referring now to FIG. 1, one embodiment of the invention provides a microfluidic device 100 including a microfluidic circuit 101 including an inlet port 102, a microfluidic flow path 104 in fluidic communication with the inlet port 102, an outlet 106 (having cross-sectional area 106*a*) in fluidic communication with the microfluidic flow path 104

(having cross-sectional area 104*a*), and a priming circuit 108 in fluidic communication with the microfluidic flow path 104 such that when a priming fluid is applied under pressure to the priming circuit 108, the priming fluid will flow through the microfluidic flow path 104 to the inlet port 102 due to low resistance to laminar flow in the microfluidic flow path 104 relative to the outlet 106.

Figure 11:
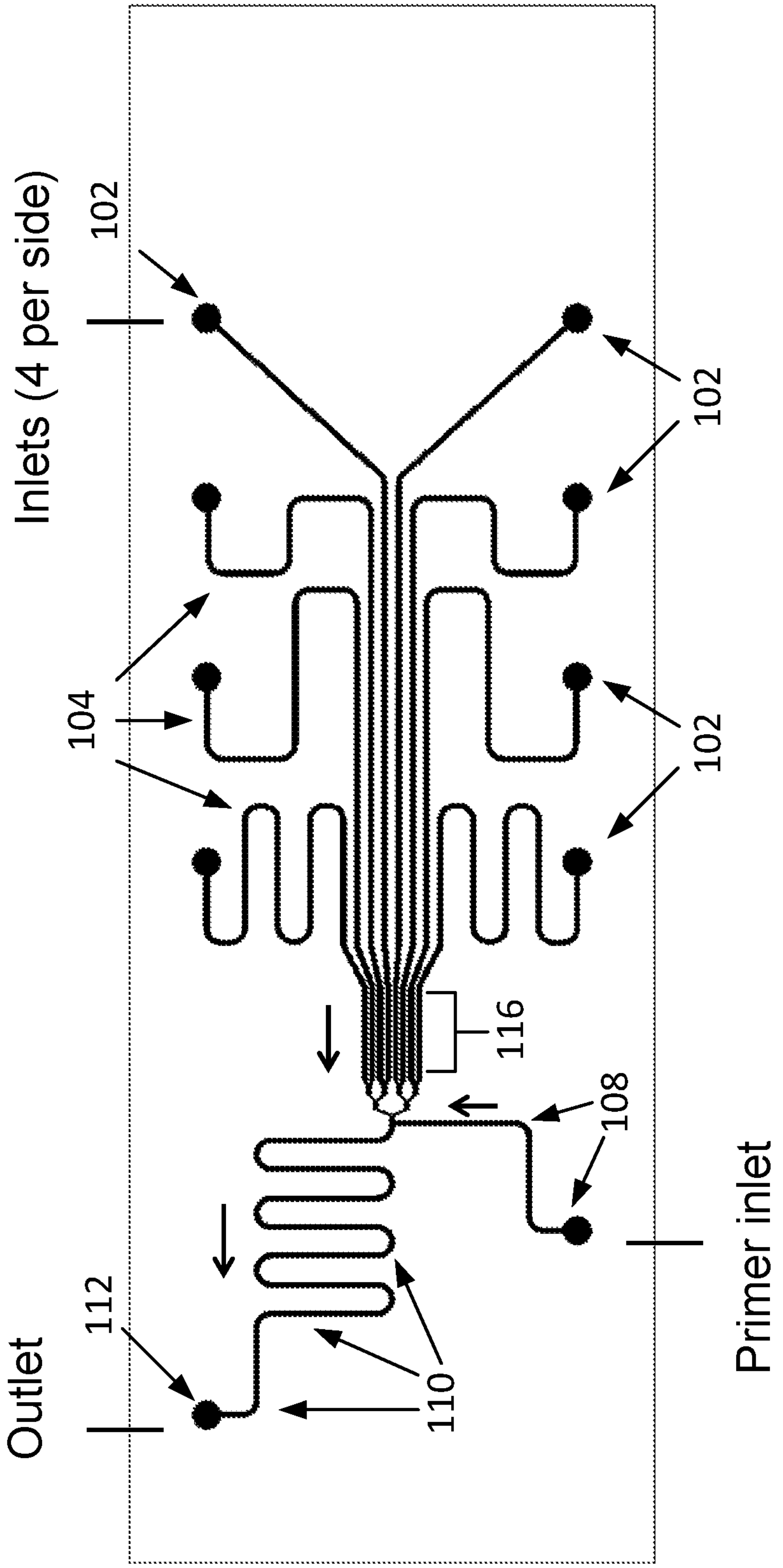
FIG. 11 depicts an exemplary microfluidic device having a single priming channel for use in monitoring blood biology under flow conditions, according to an embodiment of the invention.
Figure 14:
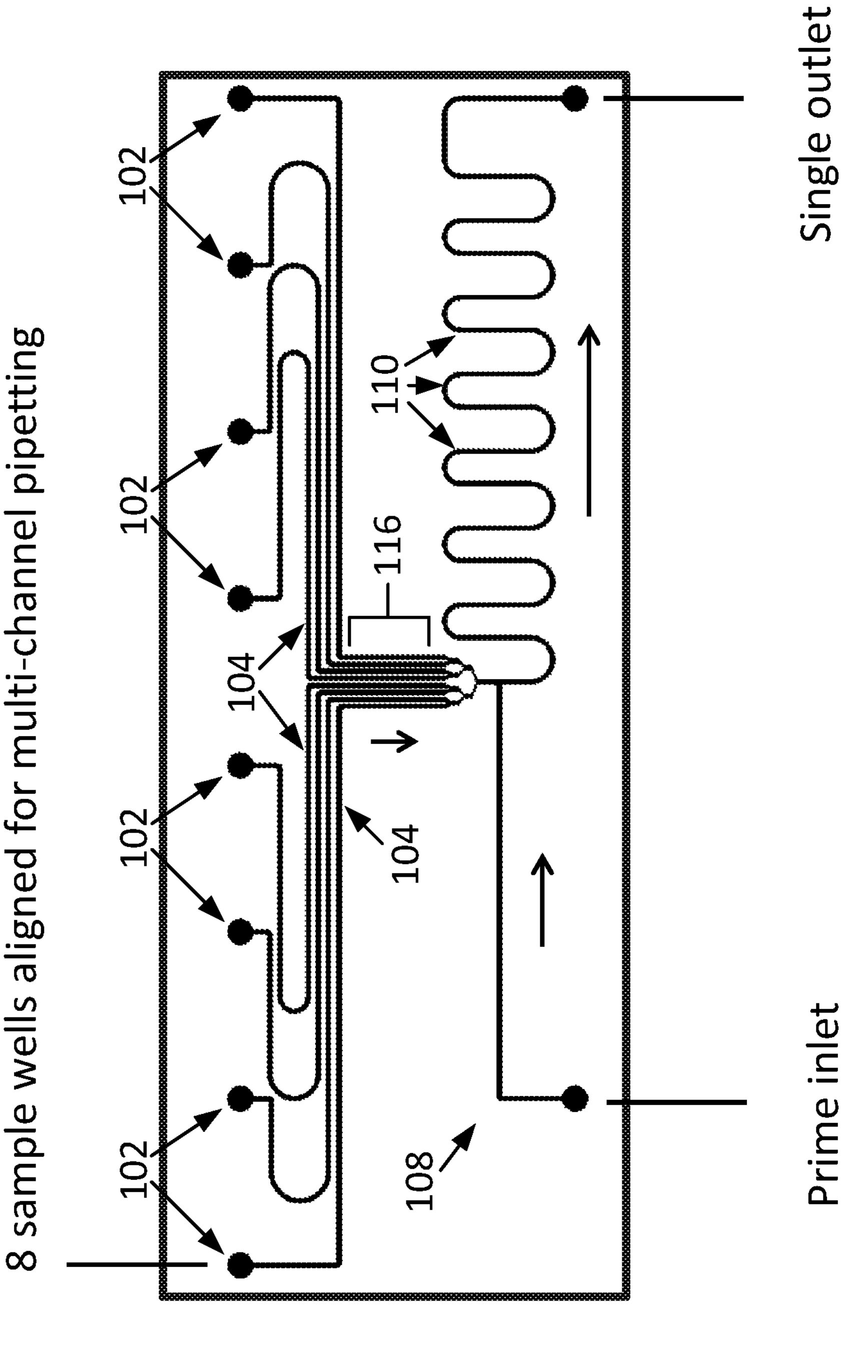
FIG. 14 depicts an exemplary microfluidic device having eight sample inlet wells suitable for multi-channel pipetting, according to an embodiment of the invention.

The outlet 106 can have a smaller cross-sectional area than the microfluidic flow path and it can be adapted for communication with a pressure sink or atmospheric pressure. In certain embodiments, the outlet 106 includes an outlet channel 110 in fluidic communication with the microfluidic flow path 104 and an outlet port 112 in fluidic communication with the outlet channel 110. In a preferred embodiment, the outlet channel 110 can have a cross-sectional area that is less than about 60% of a cross-sectional area of the microfluidic flow path 104. The outlet channel 110 may have a cross-sectional area that is about equivalent to the cross-sectional area of the microfluidic flow path 104. Outlet channel 110 may have a circuitous or serpentine configuration, as shown in FIGS. 11 and 14.

Figure 3:
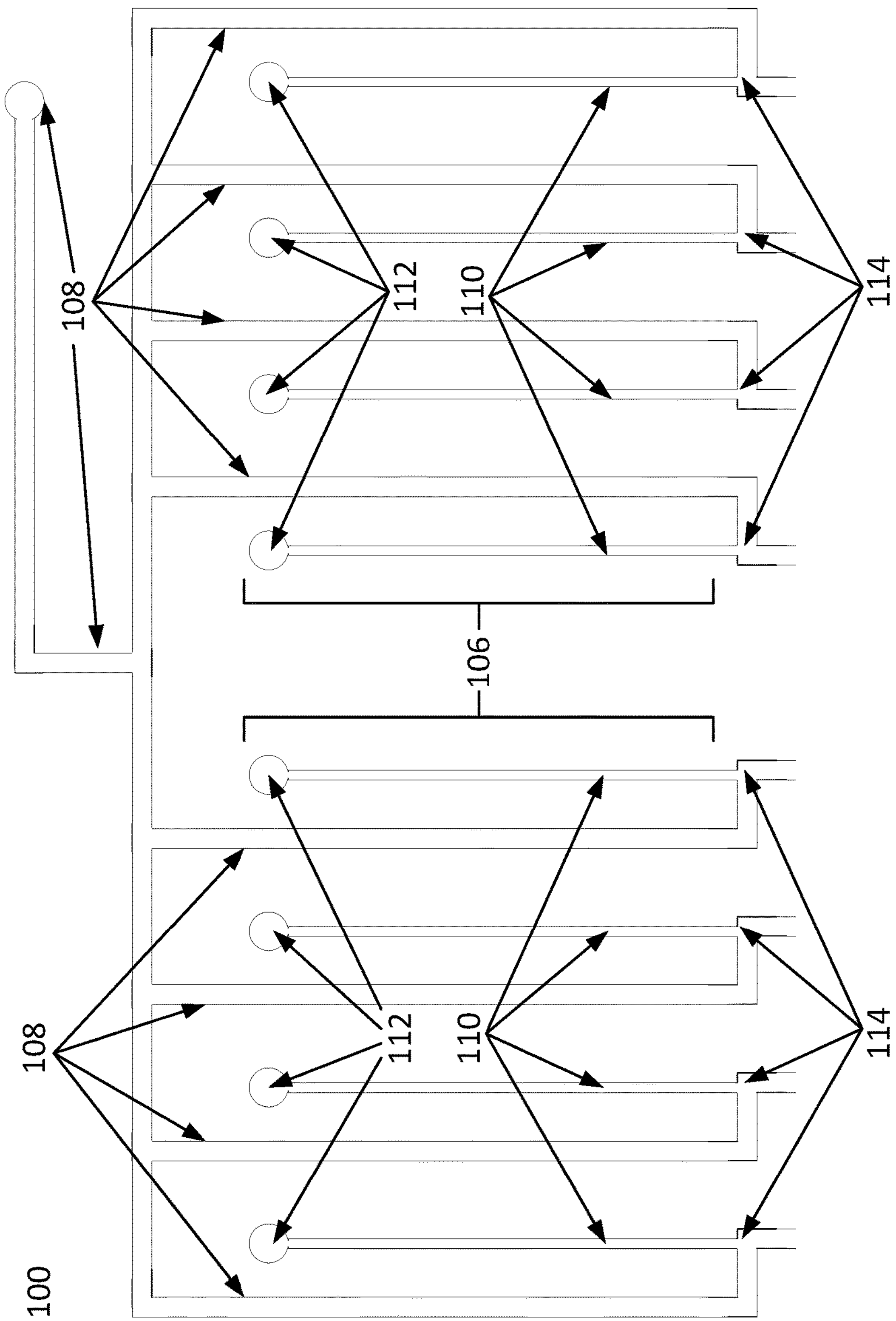
Figure 4:
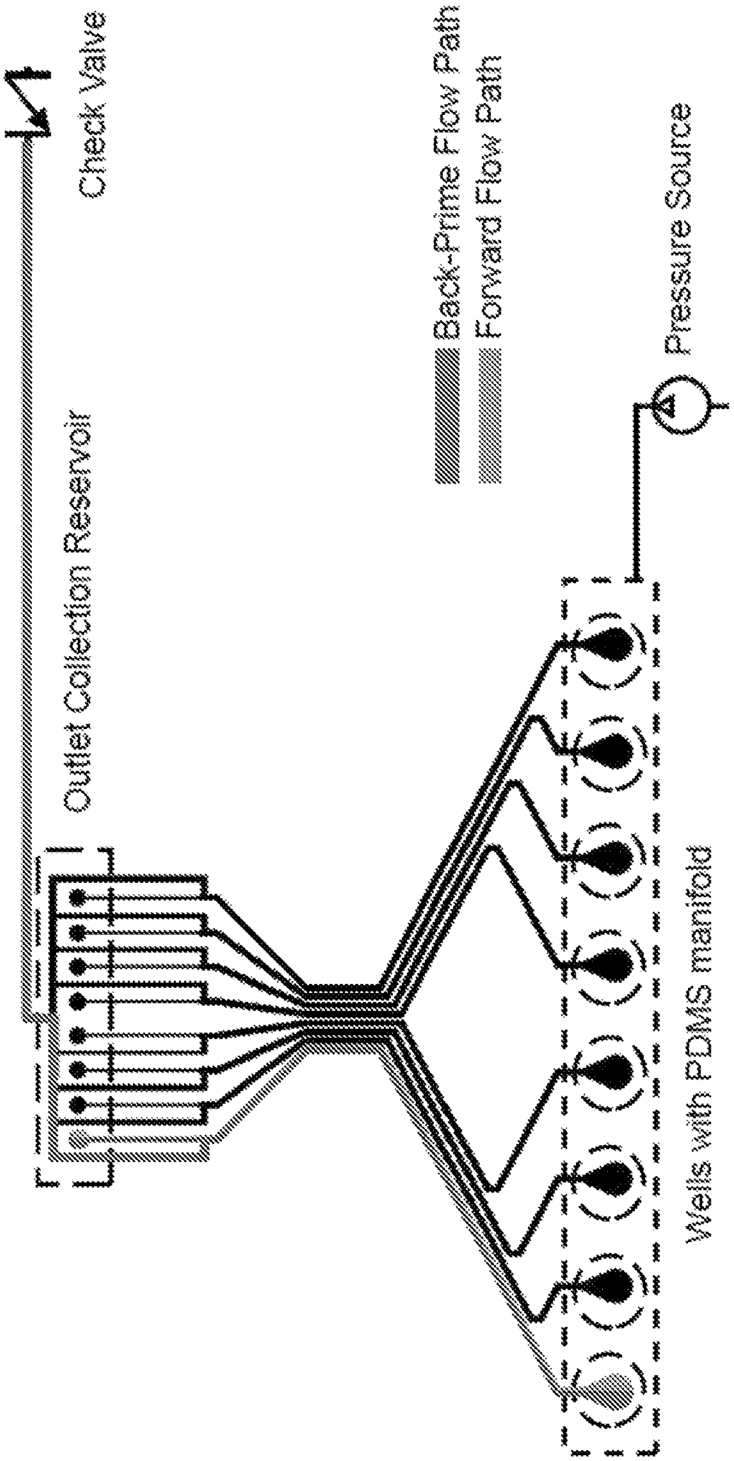
Figure 12:
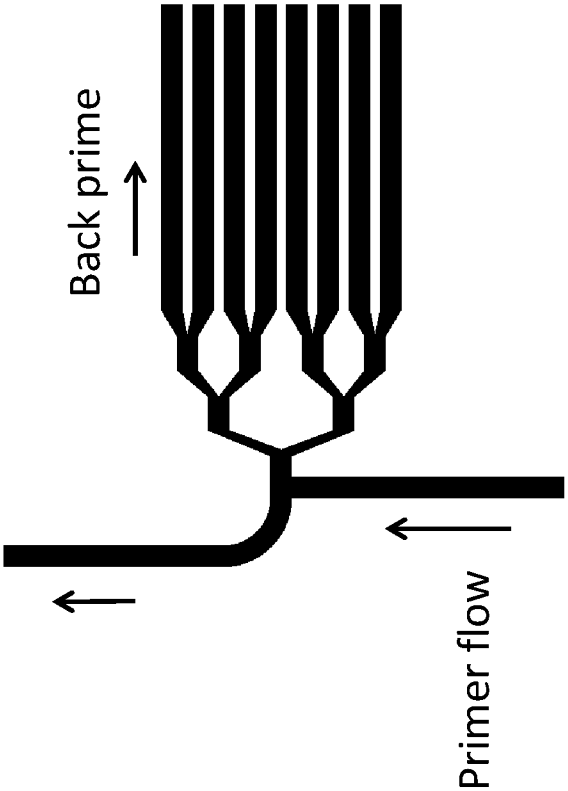
FIG. 12 depicts a zoomed-in view of a single location where the primer flow channel intersects with the inlet and outlet flow channels.

The priming circuit 108 can, but need not, have the same cross-sectional area as the microfluidic flow path 104. The priming circuit 108 can have a larger or smaller cross-sectional area as the microfluidic flow path 104. In considering the delivery of liquids into empty and air-filled channels, Applicant believes that regardless of the cross-sectional area of the priming circuit 108, in some embodiments, for example, that shown in FIG. 3, the priming fluid will preferentially flow into a cross-sectionally larger inlet to microfluidic flow path 104 over the smaller cross-sectional entrance to the outlet 106. In another embodiment, such as that depicted in FIGS. 11 and 14, the fluid resistance in microfluidic flow path 104 and outlet 106 are approximately equivalent such that the priming fluid will evenly flow into each of the microfluidic flow paths 104 and the outlet 106, simultaneously priming the flow path 104 and outlet 106. In certain embodiments, each microfluidic flow path has a priming circuit (e.g., FIG. 3). In other embodiments, the entire microfluidic device is primed with a single priming circuit (e.g., FIGS. 11, 12 and 14).

In some embodiments, the microfluidic flow path 104, the outlet 106, and the priming circuit 108 are coupled at a single location 114.

Figure 2:
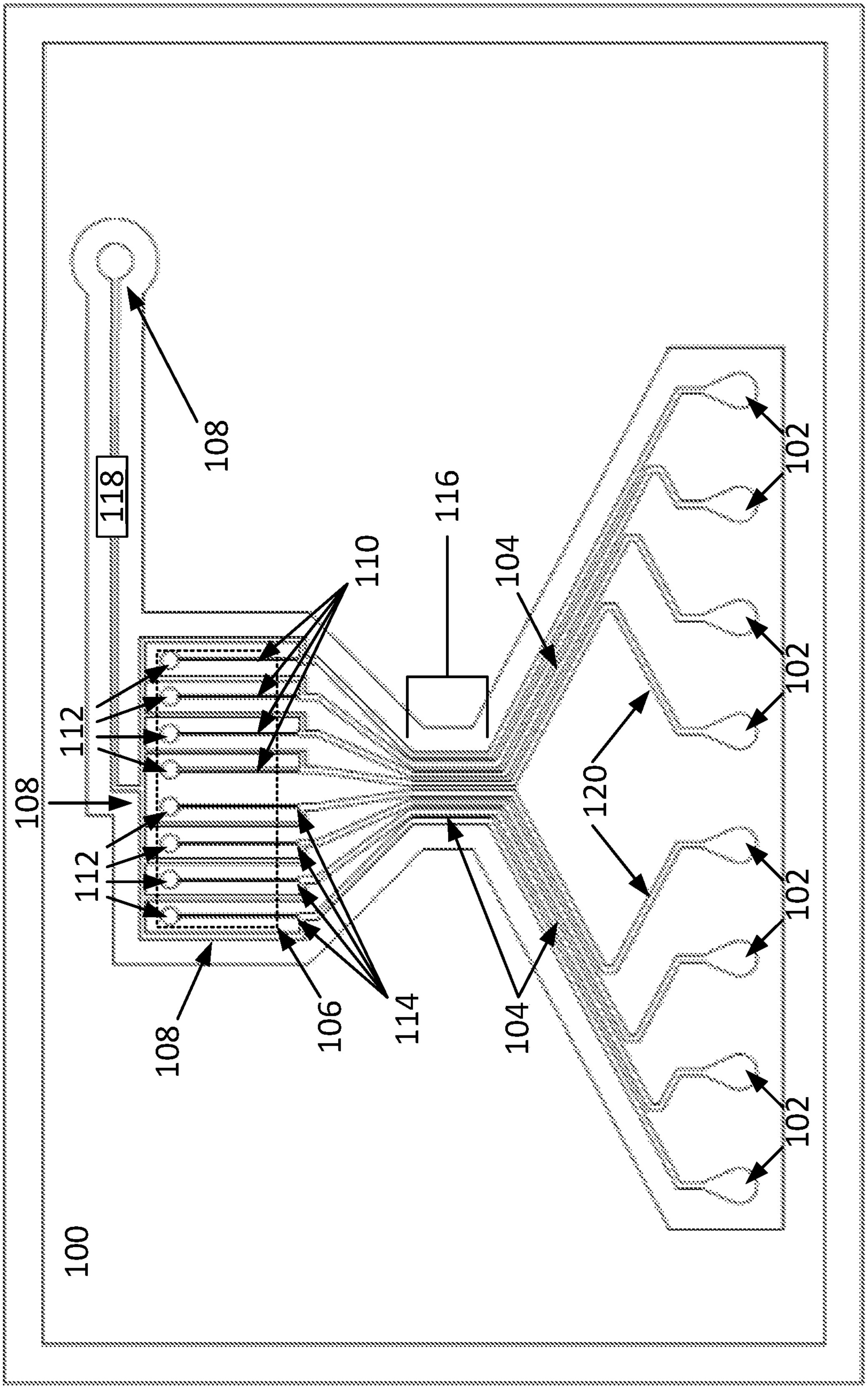

The priming circuit 108 can include a check valve 118 adapted and configured to resist flow from the microfluidic flow path 104 into the priming circuit 108, especially when the priming circuit 108 is filled with priming fluid. Referring to FIG. 2, the check valve 118 can be a single check valve in fluidic communication with a plurality of microfluidic flow paths 104. In some embodiments, the check valve 118 can be placed off the microfluidic device 100 and placed between a pumping means and the priming path inlet 108.

The microfluidic flow path 104, the outlet 106, and the priming circuit 108 can have a variety of cross-sectional profiles (as viewed axially in the direction of fluid flow). For example, the channels 104, 106, 108 can have a cross-sectional profile approximating one or more of circles, ellipses, triangles, quadrilaterals, rectangles, squares, trapezoids, parallelograms, rhombuses, pentagons, hexagons, heptagons, octagons, nonagons, decagons, n-gons, and the like. Rectangular and square channels are exemplary embodiments. In one embodiment, microfluidic flow path 104 has a height between about 40 μm and about 100 μm (e.g., about 60 μm) and a width between about 80 μm and about 300 μm.

Referring now to FIG. 2, the microfluidic device 100 can include a plurality of microfluidic circuits 101 (e.g., 2, 4, 8, 12, and other quantities corresponding to multi-channel pipettes). In one example, the plurality of microfluidic flow paths 104 can converge to a spatially compact sensing region 116. For instance, referring to FIG. 2, the sensing region 116 can be arranged such that the microfluidic flow paths 104 are aligned in parallel a short distance from one another.

In embodiments having a plurality of microfluidic circuits 101, each microfluidic flow path 104 can have a substantially identical pressure drop between the inlet ports 102 and the spatially compact sensing region 116. In embodiments in which the cross-sectional area of the microfluidic flow paths 104 is substantially uniform, the length of the microfluidic flow path 104 will dictate the pressure drop such that microfluidic flow paths 104 having identical or substantially identical lengths will exhibit identical or substantially identical pressure drops. In one embodiment, the plurality of inlet ports 102 can be aligned with one another in a straight line, equidistant apart from their nearest neighbors. In such embodiments, the inlet ports 102 can be spaced along the single straight line such that a multi-channel pipette can be used to add material to the inlet ports 102. The microfluidic flow paths 104 can then converge to the spatially compact sensing region 116. In some embodiments, such as that shown in FIG. 2, microfluidic flow paths 104 optionally include appropriate lateral legs 120 to produce a uniform path length for microfluidic flow paths 104 having inlets 102 closer to the spatially compact sensing region 116.

In certain embodiments, at least one of the inlet 102 and the microfluidic flow path 104 can contain one or more chemical agents. The chemical agents can be present in a dried form. The chemical agents can be a reagent or chemical reactant that interacts with a blood sample. In embodiments having a plurality of microfluidic circuits 101, at least a portion of the microfluidic circuits 101 can contain a different chemical agent, reagent or reactant. Examples of chemical agents can include matrix proteins, enzymes, polymers, small molecule compounds, fluorescent labeling probes especially for labeling platelets, neutrophils, fibrin, thrombin, chelating agents (EGTA, EDTA), deoxygenating agents (e.g., a dithionite salt, an ascorbate salt, or a sulfite salt), modulators of platelet function (aspirin, thromboxane receptor antagonists, integrin antagonists that block alpha-2b/beta-3, P2Y12 inhibitors, P2Y1 inhibitors, PAR1 and PAR4 inhibitors) and modulators of coagulation function (inhibitors of Factor XIIa, XIa, Xa, IXa, VIIIa, VIIa, Va, thrombin, or tissue factor). Exemplary reagents for coating a surface of path 104 in the sensing region 116, include fibrillar collagen, von Willebrand factor (VWF), lipidated tissue factor (TF), kaolin, silica, vitronectin, fibronectin, laminin, and activators of Factor XIIa. In certain embodiments, the chemical agents can be compounds that allow for the monitoring of platelets, thrombin, fibrin, RBCs, white blood cells, enzyme activity, clot stability, clotting rate, fibrinolysis, fibrinolytic resistance, NETosis, or a specified biological process indicative of drug response or disease progression. The chemical agent can be patterned on to at least a section of the microfluidic flow path 104, especially across the location of the sensing region 116. In some instances, the section of the microfluidic flow path 104 is about 100 μm to about 1,000 μm long.

The microfluidic device 100 can be made of substantially any material adapted for and compatible with storing and transport of blood. Exemplary materials include polymeric (e.g., PDMS, PMMA, PTFE, PEEK, PE, epoxy resins, thermosetting polymers), amorphous (e.g., glass), crystalline (e.g., silicon, silicon dioxide) or metallic (e.g., Al, Cu, Au, Ag, alloys) materials. Suitable polymers for fabricating the device component include glass, cyclic olefin copolymer (COC), cyclic olefin polymer (COP), polycarbonate, acrylic, polyethylene, polystyrene, and the like.

The microfluidic device 100 can be fabricated by substantially any means common in the art, including but not limited to photolithography (e.g., UV photolithography), micromachining, additive manufacturing, laser cutting, laser ablation, drilling, molding, casting, chemical vapor deposition, electron beam evaporation, and reactive ion etching. The microfluidic device can be made of two or more pieces: a chip containing the elements of the microfluidic circuit(s) 101 and a flat substrate to which the chip is bonded to. The one or more microfluidic flow paths 104 may be separated on the chip by a distance of up to about 10 μm, about 10 μm to about 5000 μm, and/or greater than about 5000 μm. The chip and the flat substrate can be bound through a method selected from ultrasonic welding, adhesives (e.g. one or more adhesive coatings as understood in the art), vacuum bonding, thermal treatment, and plasma treatment. The bonding process should be a method which does not disrupt, disturb or destroy the one or more chemical agents present in the inlet 102 and/or the microfluidic flow path 104, especially in the location of the sensing region 116.

The substrate may be flexible or rigid, transparent or nontransparent. The substrate may be constructed from one or more suitable materials that may include polymeric (e.g., PDMS, PMMA, PTFE, PEEK, PE, epoxy resins, thermosetting polymers), amorphous (e.g., glass), crystalline (e.g., silicon, silicon dioxide) or metallic (e.g., Al, Cu, Au, Ag, alloys) materials. Suitable polymers for fabricating the device component include glass, cyclic olefin copolymer (COC), cyclic olefin polymer (COP), polycarbonate, acrylic, polyethylene, polystyrene, and the like.

Biochemical-Printed Substrates

Figure 10:
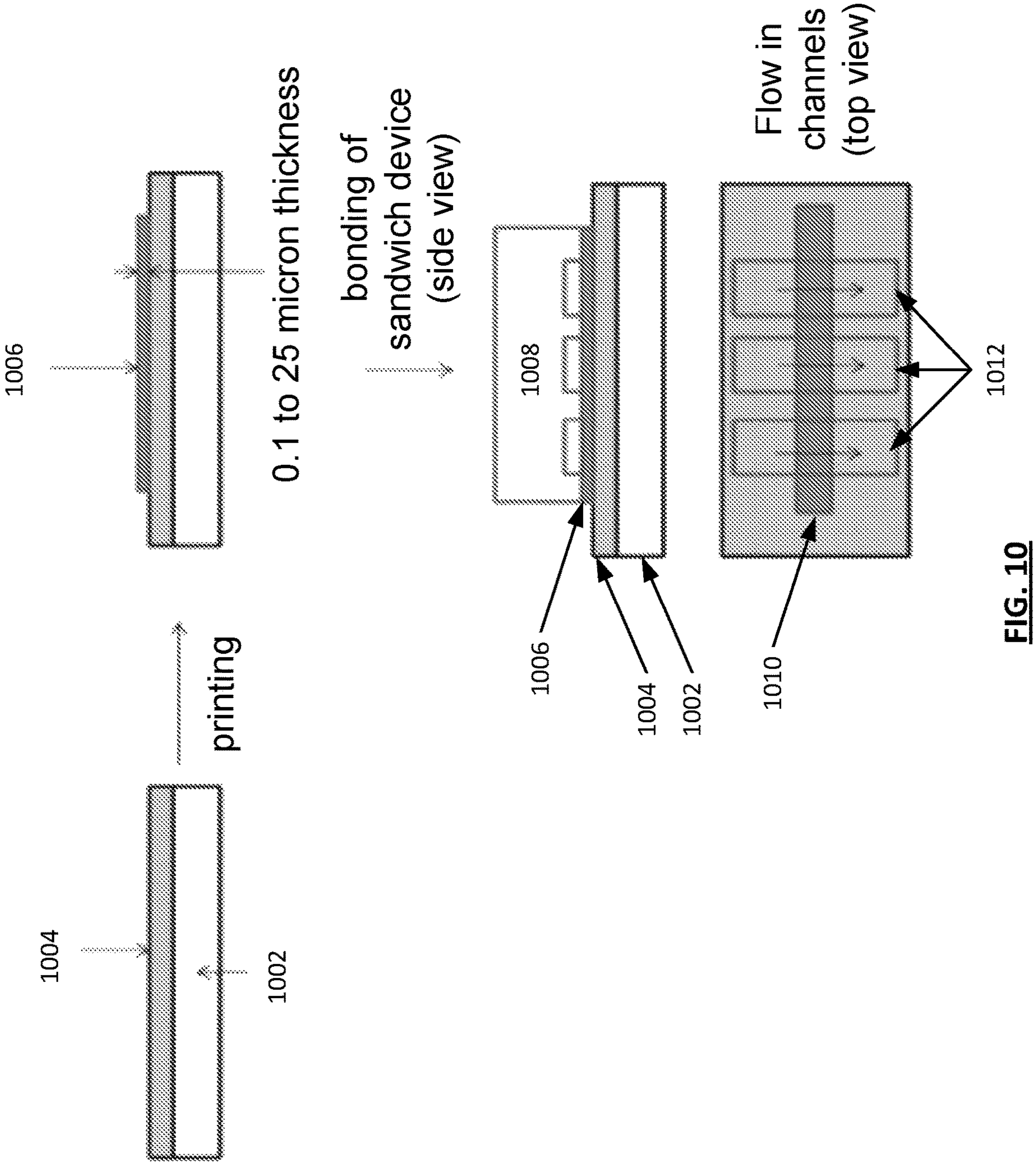
FIG. 10 depicts the assembly of an exemplary sandwich device of the present invention using biochemical constituents patterned directly on the adhesive coated on a substrate for adhesive bonding of the substrate to an additional component to form microfluidic channels.

Referring now to FIG. 10, the one or more adhesives and/or adhesive coatings 1004 may be coated with one or more biochemical constituents 1006, including for example, one or more polymers, biopolymers, proteins, small molecules, antibodies, antibody fragments, nucleic acids, liposomes, or other subcellular constituents, including mixtures containing one or more of collagen, fibrillar collagen, fibronectin, vitronectin, laminin, von Willebrand factor (VWF), lipidated tissue factor (TF), kaolin, silica, activators of Factor XIIa, and the like. Coatings can be soluble in order to interact with the priming fluid and/or the sample.

The biochemical coating 1006 may be deposited directly onto the adhesive coatings 1004, such that the biochemical coating 1006 is sandwiched between the microfluidic device 1008 and the substrate 1002, which are fluidly sealed by the adhesive coating 1002. The biochemical coating 1006 may have a thickness of about 0.1 μm to about 25 μm. The biochemical coating 1006 can be dry, semi-wet (e.g., in hygroscopic media such as glycerol), or wet (e.g., in one or more buffer solutions) once the microfluidic device is assembled before using the device for assaying a sample.

The biochemical coating 1006 can be applied in a variety of patterns and can include a variety of constituents. For example, one or more lines 1010 can be applied that each include a different composition. Such lines 1010 can be collinear with the microfluidic channels 1012 or can be angled (e.g., orthogonally) relative to the microfluidic channels 1012. Angled biochemical coating lines 1010 advantageously relax tolerances for mating the substrate 1002 and the channel-defining chip 1008.

Although the biochemical coating 1006 in FIG. 10 is depicted with a uniform thickness after mating with microfluidic chip 1008, the biochemical coating 1006 and/or adhesive 1004 may compress or flow laterally in regions contacting the microfluidic chip 1008.

Applicant has invented a process such that even with angled biochemical coatings extending laterally beyond the sidewalls of the microfluidic channels 1012 (e.g., between channels 1012), the microfluidic channels 1012 remain liquid-tight at least over the course of a typical microfluidic experiment (e.g., for at least 1 minute, for at least 5 minutes, for at least 10 minutes, for at least 15 minutes, for at least 20 minutes, for at least 30 minutes, and the like).

Biochemical coating(s) 1006 can be applied using a variety of fluid handling techniques including spraying, printing (e.g., using ink-jet techniques), pipetting, silk screening, masking, and the like.

Coupling with Other Devices

The microfluidic device 100 can be coupled to an imaging device capable of collecting imaging data along the one or more microfluidic paths 104. The imaging device can include at least one device selected from a visible light camera, a photodiode, a diode array detector, a UV-Vis spectrometer, an infrared camera, an infrared spectrometer.

The devices of the invention can be operated automatically and can be made to be compatible with robotic liquid dispensers and automated sensing equipment. The microfluidic device 100 can further include a computer for storing information, controlling robotic components, regulating applied pressures, operating imaging devices, and recording collected data.

The devices of the invention provide a number of notable benefits over devices common in the art. Notably, the microfluidic device can be incorporated on to a chip that remains stable under dry storage for over three months. Additionally, the devices can be loaded and manipulated without extensive training as will be discussed below. As such, the devices are particularly useful for translation to clinical laboratories.

Methods

The invention further provides methods of measuring a fluid (e.g., blood, urine, saliva, water sample) using the microfluidic devices of the invention.

The methods of the invention include injecting a volume of a priming fluid (e.g., water, saline, and the like, a saline solution containing added protein such as albumin, or other suitable fluid including one or more blocking buffers as understood in the art) through the priming circuit 108 of the microfluidic device 100, thereby priming the one or more microfluidic circuits 101. The microfluidic device may be primed with a volume of priming fluid including up to 100 μl, 100 to 200 μl, 200 μl to 500 μl, 500 μl to 1000 μl, and the like. One or more samples (e.g., blood) is then loaded into one or more of the inlet ports 102. A pressure source is then applied to the one or more inlet ports 102 in order to force the blood into the one or more microfluidic flow paths 104 while imaging the flow along the one or more microfluidic paths 104. The samples moving through the paths 104 cannot enter the priming path 108 due to the check valve 118 and due to the incompressibility of the priming fluid resident in path 108.

A defined volume of priming fluid can be injected to prime the device. Alternatively, priming fluid can be injected until priming fluid is visible in inlets 102.

A defined volume of sample (e.g., 50 μl to 100 μl, 100 μl to 200 μl, 200 μl to 500 μl, or up to 1 mL) can be loaded into inlets 102. Alternatively, the sample can be loaded by sight (e.g., until the inlets 102 are filled to a visualized level).

The imaging can take place at the spatially compact sensing region 116, if present, allowing for imaging of multiple microfluidic paths 104 simultaneously. The priming step can take place up to about 1 hour before the loading of the blood sample into the one or more inlet ports 102. For example, a technician can prime a number of devices before loading those devices with samples.

Figure 15:
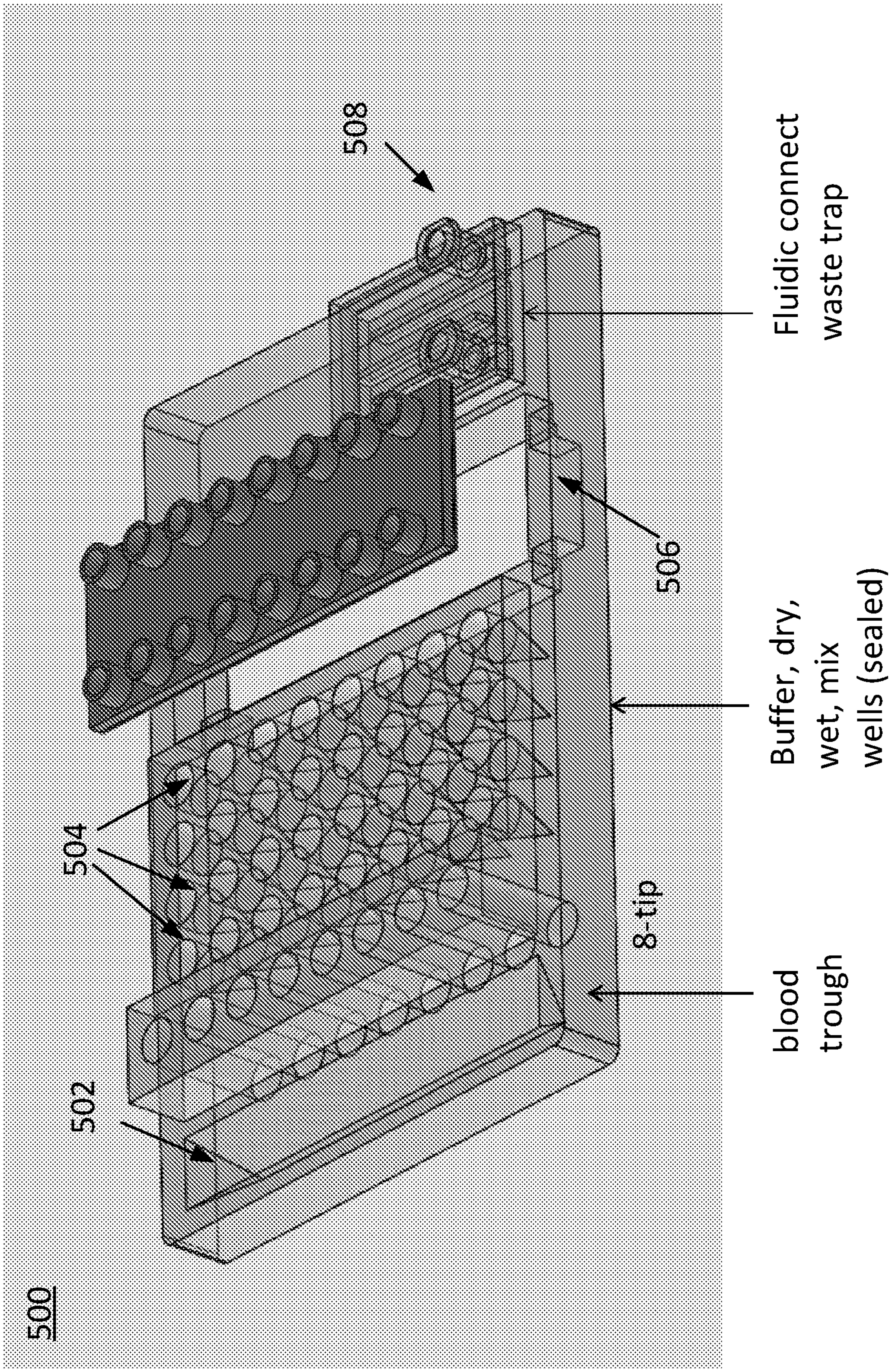
FIG. 15 depicts an exemplary cartridge frame that can be used with the microfluidic device according to an embodiment of the invention.

The microfluidic device may be placed in a frame 500, shown in FIG. 15, which includes one or more troughs 502 for containing sample (e.g. blood), one or more wells 504 containing buffer, including priming solution, and one or more waste traps 508 for collection of outflow fluid. The device may be loaded while mounted in chip slot 506 of frame 500. The device may be imaged while mounted in the frame.

In certain embodiments, the sample is pre-mixed with one or more reagents. In other embodiments, the sample is contacted with one or more reagents present within at least one of the inlet port 102 and the microfluidic flow path 104. In still other embodiments, the sample is both pre-mixed with one or more reagents and contacted with a reagent within the microfluidic circuit 101.

The sample can be added to the inlet port 102 through substantially any means common in the art, including, but not limited to, via syringe or pipette. In embodiments that have inlet ports 102 aligned in a single line as described elsewhere herein, the samples can be added to the inlet ports via multi-channel pipette.

Pressure can be applied using a variety of devices. For example, a manifold can be pressed or clamped over the inlets 102 and pressurized. In certain embodiments, the applied pressure is maintained at a sufficient pressure to establish a center line wall shear rate of about 10 to about 10,000 $s^{-1}$, or about 10 to about 2,000 $s^{-1}$. The applied inlet pressure can be maintained at a constant pressure in a range of about 1 mm-Hg to about 500 mm-Hg. In another embodiment, a constant pressure less than atmospheric pressure (a negative pressure) can be applied to the exit location in order to pull blood from the inlet across the device to the outlet. In other embodiments, a syringe pump can infuse a hydraulic fluid such as a salt water buffer to push blood at a constant flow rate across the device from the inlet to the outlet. In another embodiment, a syringe pump can be attached to the outlet of the device for withdrawal of blood at constant flow rate.

In certain embodiments, the method can be an automated method carried out by one or more computer controlled robots.

The sample can be derived from any animal. In some instances the animal is a mammal; in other instances, the animal is a human.

EXAMPLES

Materials and Methods

Figure 5:
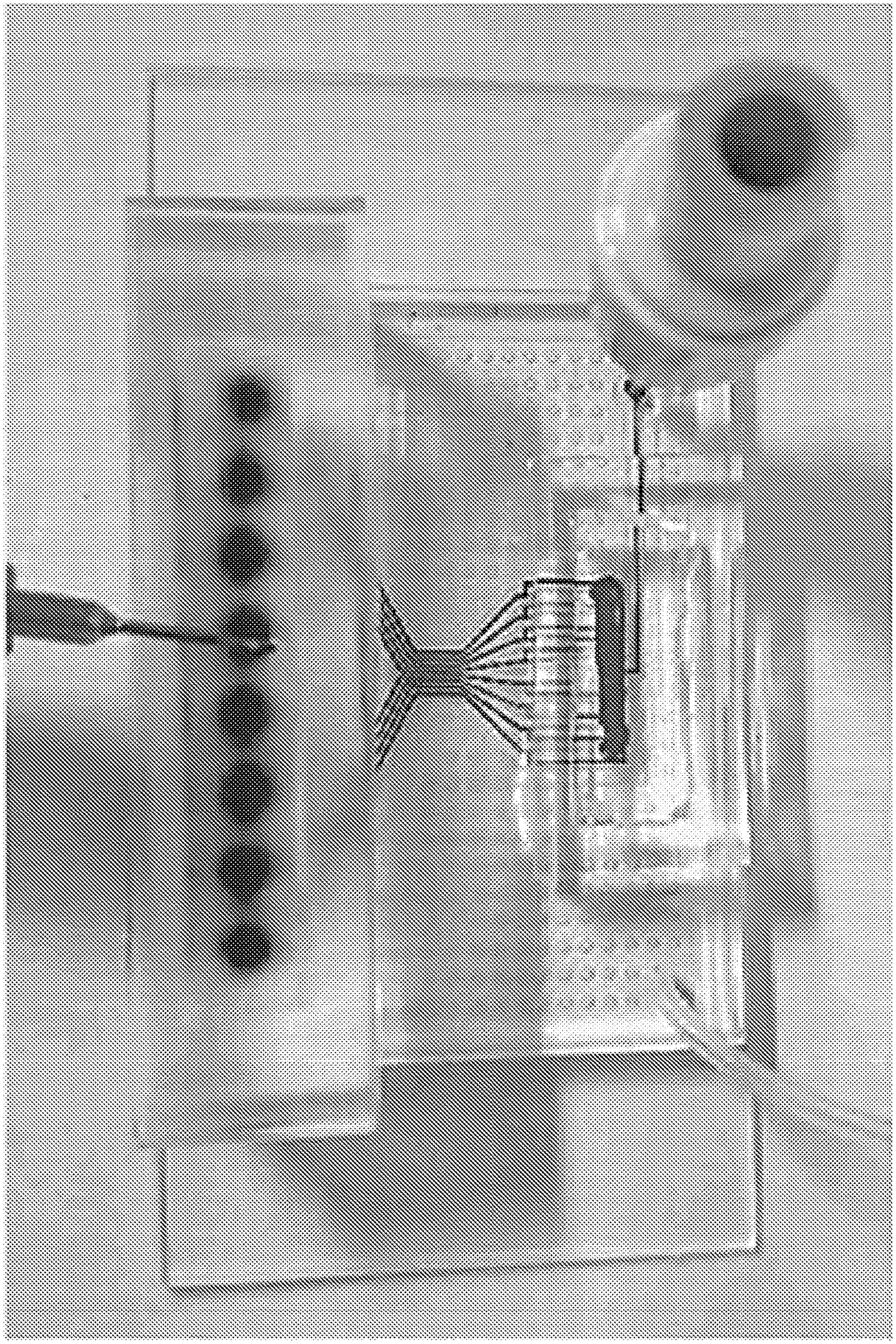

The device can be configured with all inlets, outlets, priming path and collagen-patterned surface in the sensing region using layers that are bonded together. In FIG. 5, a device is shown assembled from components. The microchannels are molded into a polymer such as PDMS that is polymerized on a wafer patterned by etching with small features to create channels within the polymer. The wafer is obtained by standard lithography techniques whereby a mask allows the exposure of a precise pattern on a photosensitive coating such as SU8 that can then be etched. The polymer device is removed from the wafer and configured with an inlet pressure chamber, outlet reservoir, and off-chip priming tubing and check valve. The device is bonded to a flat substrate presenting a patterned surface in the sensing zone of the fluidic device.

Figure 6A:
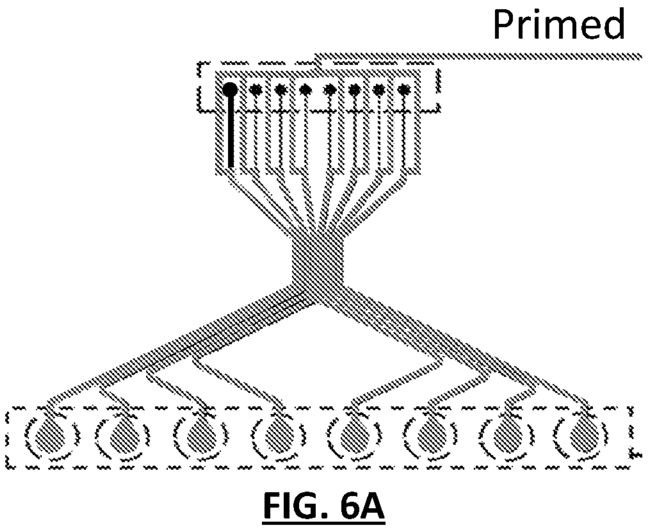
FIGS. 6A-6C depict a step-by-step method of priming a microfluidic device according to an embodiment of the invention (FIG. 6A), loading samples in wells of the microfluidic device (FIG. 6B) and pressurizing the microfluidic device, passing the samples through the sensing zone (FIG. 6C).
Figure 6B:
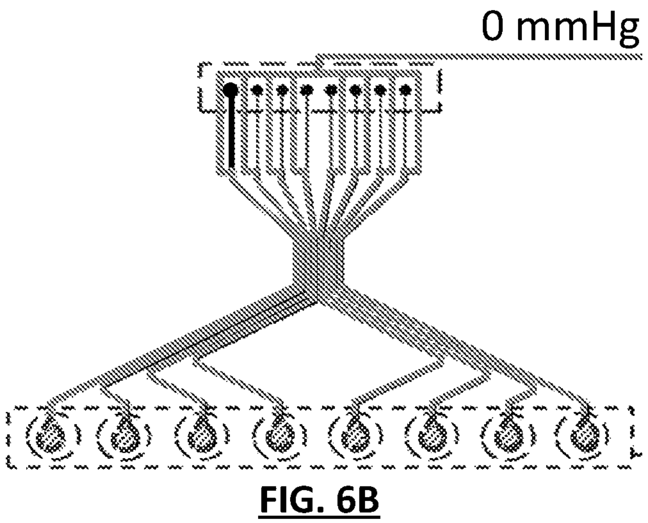
Figure 6C:
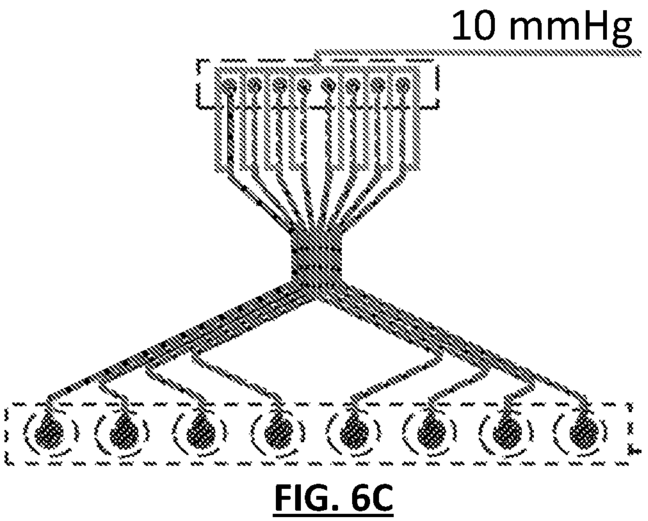
Figure 13A:
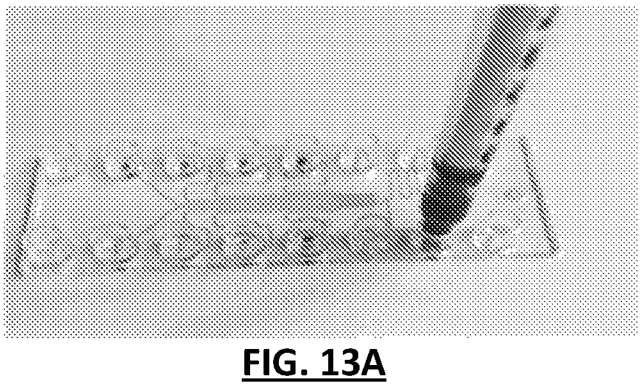
FIGS. 13A-13C depict a step-by-step method of preparing and priming an exemplary microfluidic device according to an embodiment of the invention.
Figure 13B:
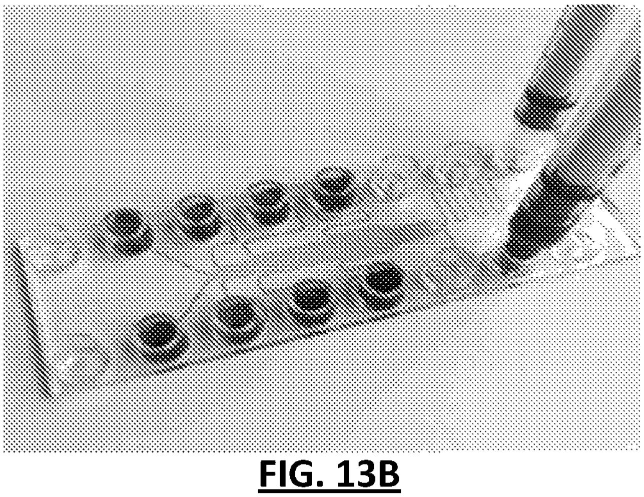
Figure 13C:
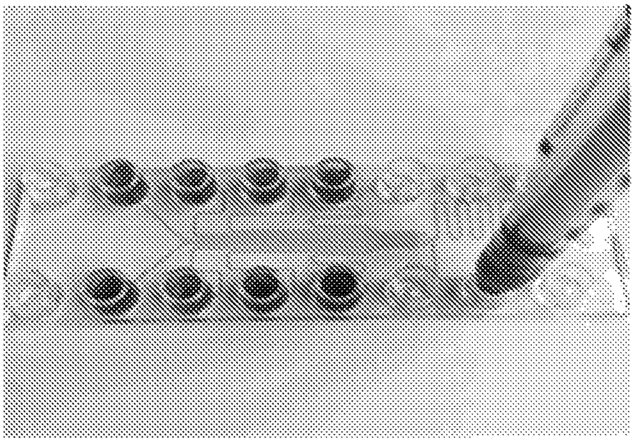

Use of the device is shown in FIG. 5 where priming fluid is delivered through the check valve, blood samples are delivered to 8 inlet wells, and the inlet pressure chamber is sealed by an upper lid that is attached to a pressure source. In FIG. 6A, the device is first primed with a red-dye priming liquid, then the inlet wells are filled with a blue-dye test liquid (FIG. 6B), after which a pressure source is attached (FIG. 6C) to apply 10 mm-Hg of pressure to drive the blue-dye test liquids through the 8 individual paths, thereby displacing the red-dye priming liquid as the blue-dye test liquid flows from the inlet to the outlet of each channel. In FIG. 13A, an exemplary device is first primed with a green-dye priming liquid. Then, the inlet wells are filled with a red/orange-dye test liquid (FIG. 13B), and the test liquid displaces the green-dye priming liquid as the red/orange-dye test liquid flows from the inlet to the outlet channel while not mixing with the priming circuit (FIG. 13C).

Figure 7A:
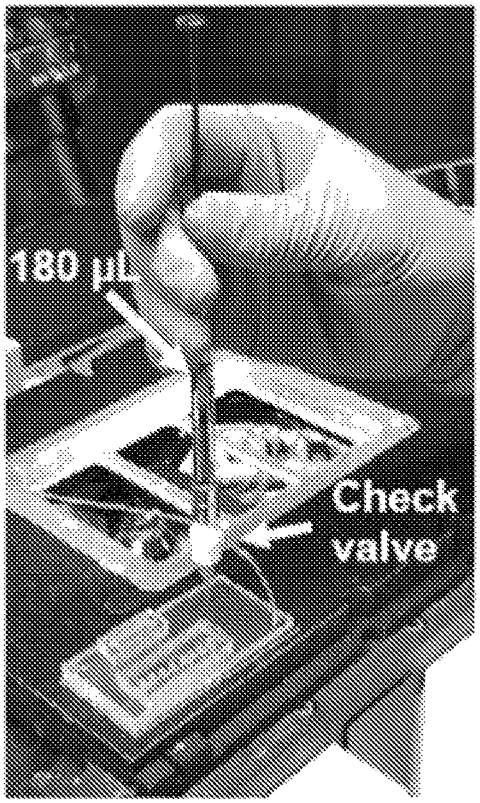
FIGS. 7A-7E depict a step-by-step method of preparing and priming a microfluidic device according to an embodiment of the invention.
Figure 7B:
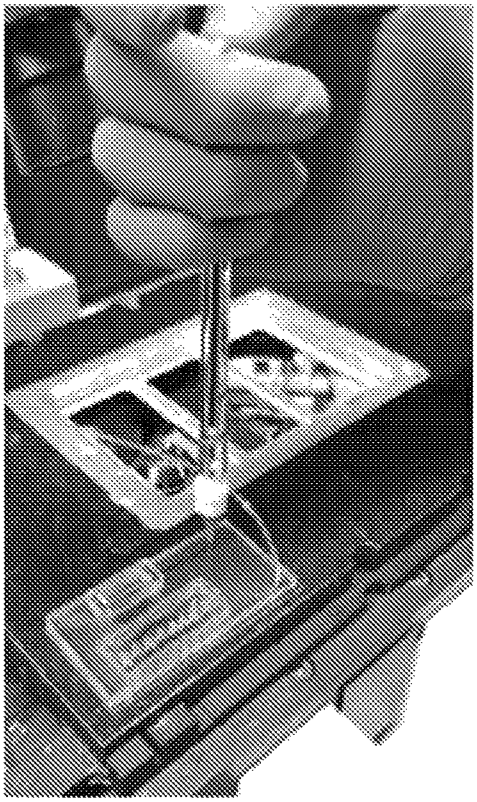
Figure 7C:
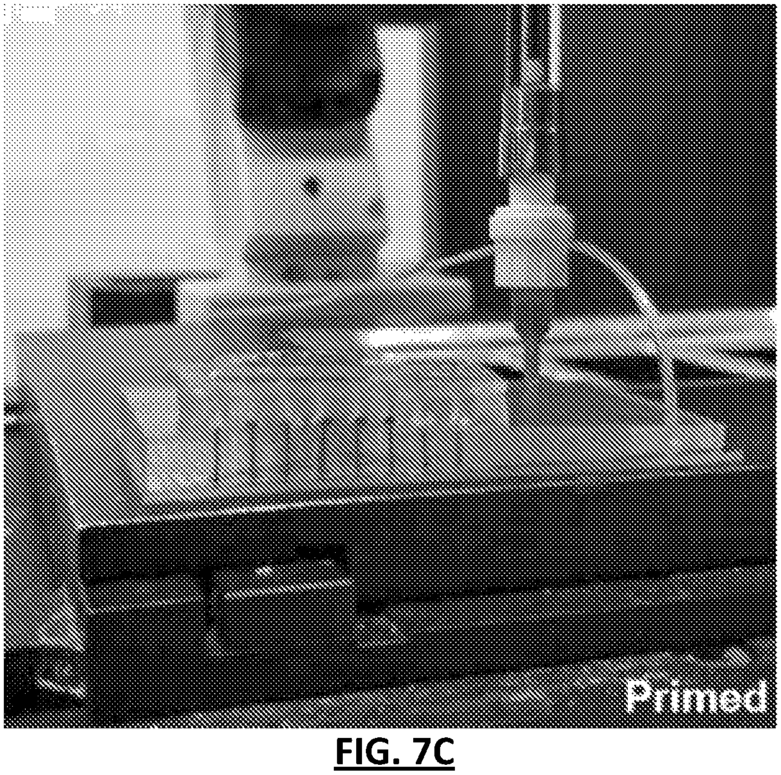
Figure 7D:
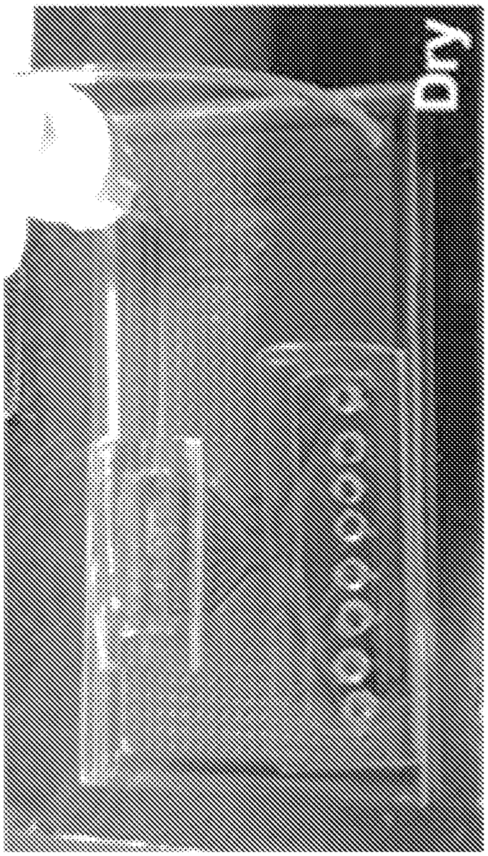
Figure 7E:
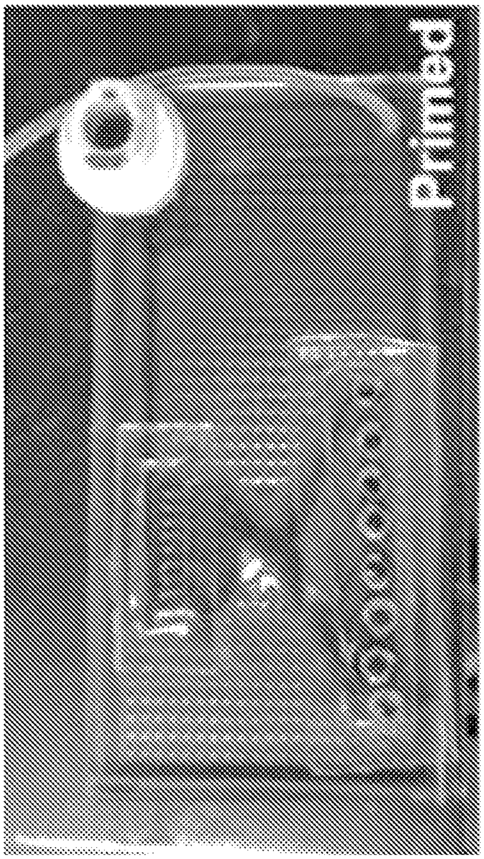

To operate the chip, the priming step is shown in FIG. 7 for manual delivery of a priming fluid to the device where a syringe is connected to the priming inlet (FIG. 7A), and the syringe is actuated manually to deliver the priming fluid through a check valve and into the device (FIG. 7B) resulting in the completing priming of the device including priming to the inlet reservoirs where the test samples will be delivered (FIG. 7C). These manual steps can easily be replaced with a robotic fluid dispenser system or a preattached prefilled syringe that is actuated by automated movement of the syringe plunger. The use of a priming fluid at the time of use allows the device to be stored under a dry condition (FIG. 7D) and then to be fully primed with a priming fluid (red-dye priming fluid in FIG. 7E) in preparation for use of the device with individual test samples such as blood.

Example 1

Figure 8:
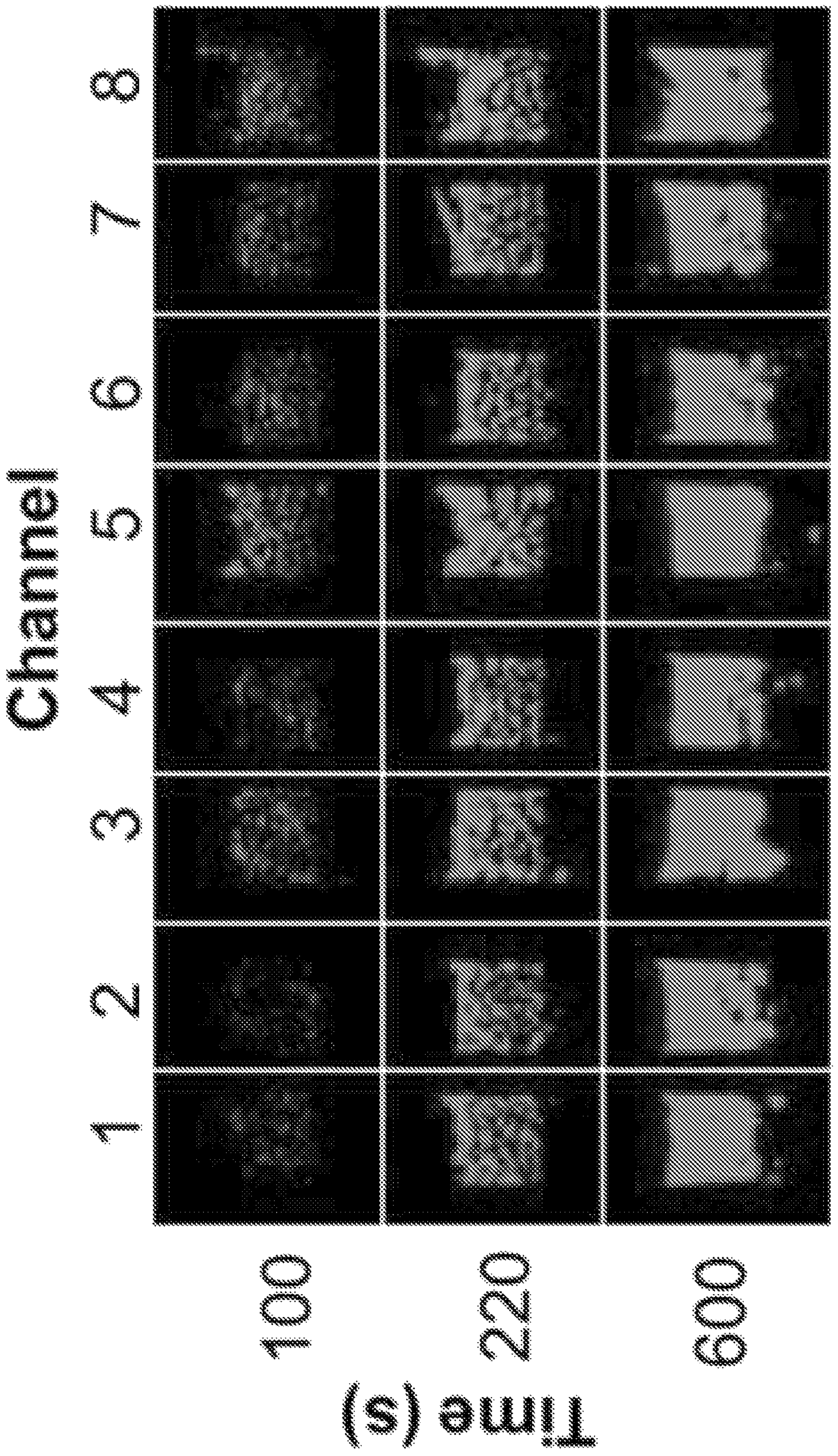
FIG. 8 is a set of fluorescence images taken of 8 replicate channel locations showing fluorescent platelet deposition with time at a specific location where collagen was prepatterned on one of the surfaces of each channel.
Figure 9:
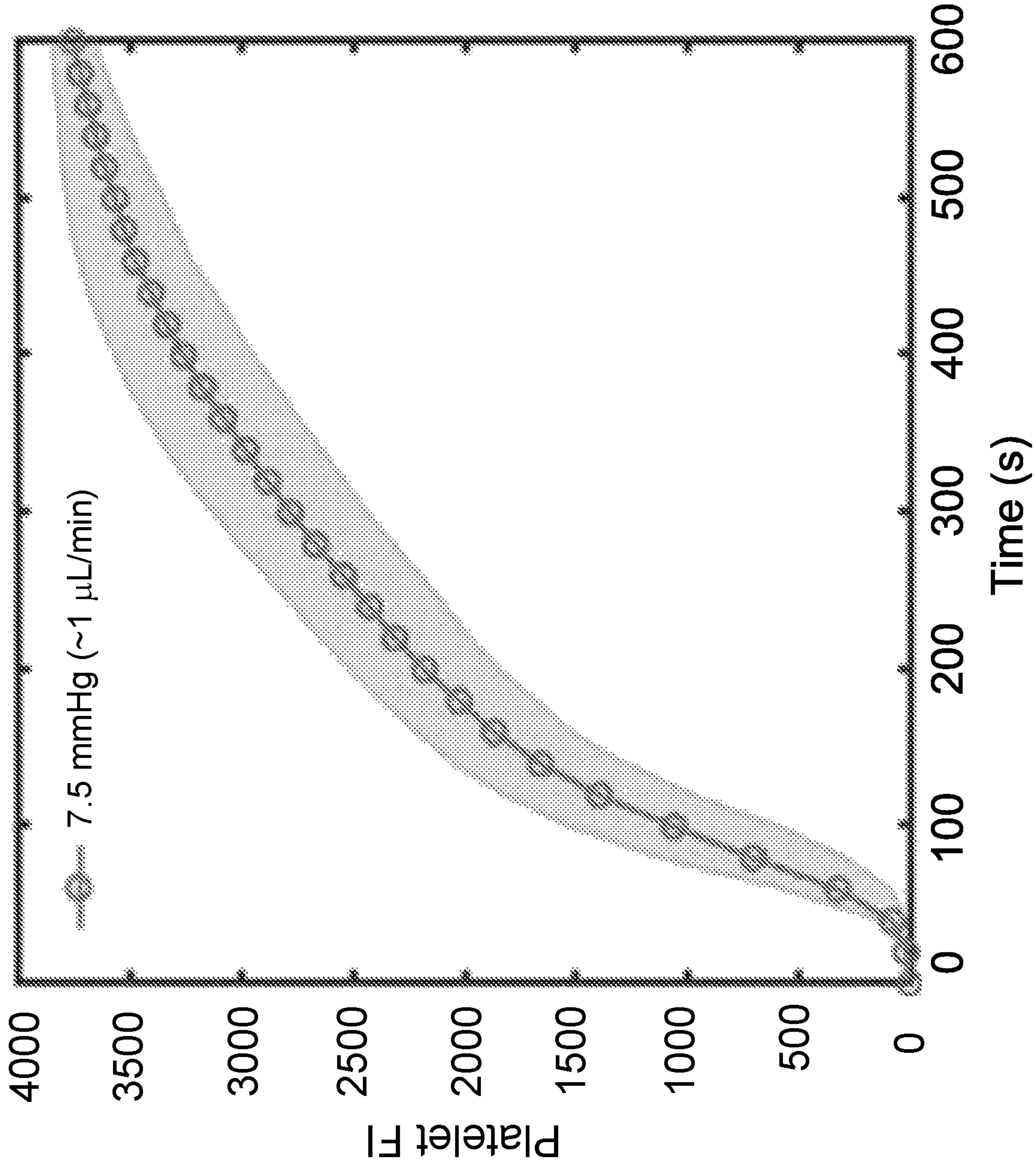
FIG. 9 is a graph reporting the average fluorescence intensity and standard deviation of platelet deposition with time for 8 replicate channels.

In tests of platelet function, a fluorescent antibody to label platelets can be added to the blood sample and the blood sample can be delivered to the primed device. Application of pressure to the inlet will drive the individual samples across the collagen-coated strip in sensing region of the device. All individual channels can be imaged simultaneously (FIG. 8) as platelets accumulate on the collagen. Images can be obtained a video rates (30 frames per sec) or at slower sampling rates of 1 frame every 1 to 30 sec. Image processing allows regions of interest to be defined in the image that correspond to the individual clotting zones in the sensing region of the device. In these defined regions of interest, the fluorescence intensity can be determined with time using standard image analysis techniques. In FIG. 9, all the individual sensing regions are averaged together to give a mean fluorescence and standard deviation of fluorescence for 8 unique replicate clotting events for the course of clotting from 0 to 600 sec of chip operation.

Example 2

In some experiments, blood is treated with d-phenylalanyl-prolyl-arginyl chloromethyl ketone (PPACK) to inhibit thrombin and/or apixaban to inhibit Factor Xa. Other anticoagulants could include heparin, citrate, hirudin, and the like. The blood is further treated with a platelet label and perfused over collagen to evaluate platelet response to collagen. In variations of this experiment, increasing doses of antiplatelet agents are added to some of the blood samples and a dose-response and patient drug sensitivity can be established for a given antiplatelet agent using a single device. Common anti-platelet agents include aspirin, indomethacin, P2Y12 inhibitors, prostacyclin, prostacyclin analogs, integrin antagonists, and the like.

In some experiments, blood is treated with corn trypsin inhibitor to inhibit Factor XIIa. The blood is further treated with a platelet label and a fibrin label (anti-fibrin or fluorescent fibrinogen) and a thrombin label (low doses of 1 to 600 nM fluorescent PPACK or platelet targeting thrombin sensors) and perfused over collagen/TF surfaces to evaluate platelet response to collagen in the presence of robust thrombin generation and fibrin polymerization. In variations of this experiment, increasing doses of antiplatelet agents are added to some of the blood samples and a dose-response and patient drug sensitivity can be established for a given antiplatelet agent using a single device. Common anti-platelet agents include aspirin, indomethacin, P2Y12 inhibitors, prostacyclin, prostacyclin analogs, integrin antagonists, and the like. In variations of this experiment, increasing doses of anticoagulant agents are added to some of the blood samples and a dose-response and patient drug sensitivity can be established for a given anticoagulant agent using a single device. Common anti-coagulant agents including, but not limited by, those targeting Factors XIIa, XIa, Xa, IXa, VIIIa, VIIa, Va, IIa (thrombin) or tissue factor, TFPI, Protein S, Protein Z, activated protein C, or PAR 1 or PAR4 inhibitors.

In some experiments, blood from patients with known or suspected hemophilias or bleeding disorders can be applied to the device along with agents that promote blood clotting such as those enhancing the production of thrombin and fibrin during a clotting event or enhancing platelet adhesion such as von Willebrand Factor.

In some experiments, blood from patients suffering acute trauma can be applied to the device to evaluate platelet function, thrombin generation rate, fibrin polymerization rate as a measure of bleeding risk and as a tool to guide choices of transfusion products or pharmacological agents.

In some experiments, after a fixed time of perfusion and clotting, the pressure of the inlet can be acutely reduced to 0 PSIG such that flow across the microchannels stops due to the absence of a pressure drop. In this situation, platelet released products such as ADP, ATP, and thromboxane are not washed away by the flow field and instead accumulate to high levels to drive platelet retraction and overall clot retraction, which is easily observed by image analysis whereby the clot reduces its area over time.

In some experiments, after a fixed time of perfusion and clotting, the pressure of the inlet can be acutely increased by 1.5 to 10-fold such that flow across the microchannels increases and the shearing forces on the clots in the sensing region increases. In this situation, clot embolization can occur as a metric of weak clot structures. Embolization is easily observed by image analysis whereby the clot reduces its mass over time as indicated by a decline in clot associated fluorescence. In variations of this experiment, modulators of platelet function including contraction, thrombin generation, or fibrin polymerization can be added to some of the wells to understand the effect of those pathways on overall clot strength.

The invention claimed is:

1. A microfluidic device having a chip comprising:

an inlet port configured to receive a fluid sample;

a microfluidic flow path in fluidic communication with the inlet port;

an outlet in fluidic communication with the microfluidic flow path, the outlet:

having a smaller cross-sectional area than the microfluidic flow path;

a priming circuit in fluidic communication with the microfluidic flow path such that when a priming fluid is applied under pressure to the priming circuit, the priming fluid will flow through the microfluidic flow path to the inlet port; and a check valve in fluidic communication with the microfluidic path, wherein the check valve is configured to resist flow from the microfluidic flow path into the priming circuit.

2. The microfluidic device of claim 1, wherein the outlet comprises:

an outlet channel in fluidic communication with the microfluidic flow path; and an outlet port in fluidic communication with the outlet channel.

3. The microfluidic device of claim 1, wherein the outlet channel has a cross-sectional area that is less than about 60% of a cross-sectional area of the microfluidic circuit.

4. The microfluidic device of claim 1, wherein the microfluidic flow path, the outlet, and the priming circuit are coupled at a location, whereby the priming fluid applied to the priming circuit flows through the microfluidic flow path to the inlet port.

5. The microfluidic device of claim 1, further optionally comprising:

one or more dried reagent(s) within the inlet and the microfluidic flow path.

6. A method for monitoring blood flow, the method comprising:

injecting a priming fluid through the priming circuit of the microfluidic device of claim 1;

loading blood into the inlet port;

applying a pressure source to the inlet port to force the blood into the microfluidic flow path; and imaging blood flow along the microfluidic path.

7. The method of claim 6, further comprising pre-mixing the blood with one or more reagents.

* * * * *